United States Patent
Dubbert et al.

(10) Patent No.: US 8,400,349 B1
(45) Date of Patent: Mar. 19, 2013

(54) RADAR ECHO PROCESSING WITH PARTITIONED DE-RAMP

(75) Inventors: Dale F. Dubbert, Cedar Crest, NM (US); Bertice L. Tise, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 294 days.

(21) Appl. No.: 12/844,576

(22) Filed: Jul. 27, 2010

Related U.S. Application Data

(60) Provisional application No. 61/352,853, filed on Jun. 9, 2010.

(51) Int. Cl.
*G01S 13/58* (2006.01)
(52) U.S. Cl. .......................... 342/113; 342/128; 342/129
(58) Field of Classification Search ........... 342/104–146
See application file for complete search history.

(56) References Cited

U.S. PATENT DOCUMENTS

| | | | | |
|---|---|---|---|---|
| 5,361,072 A | * | 11/1994 | Barrick et al. | 342/133 |
| 5,499,029 A | * | 3/1996 | Bashforth et al. | 342/22 |
| 5,657,022 A | * | 8/1997 | Van Etten et al. | 342/104 |
| 7,773,205 B2 | * | 8/2010 | Cooper et al. | 356/5.15 |
| 2004/0239549 A1 | * | 12/2004 | Morgan et al. | 342/25 R |
| 2009/0209222 A1 | * | 8/2009 | Li et al. | 455/323 |
| 2010/0202566 A1 | * | 8/2010 | Fudge et al. | 375/324 |

* cited by examiner

*Primary Examiner* — Timothy A Brainard
(74) *Attorney, Agent, or Firm* — Scott B. Stahl

(57) ABSTRACT

The spurious-free dynamic range of a wideband radar system is increased by apportioning de-ramp processing across analog and digital processing domains. A chirp rate offset is applied between the received waveform and the reference waveform that is used for downconversion to the intermediate frequency (IF) range. The chirp rate offset results in a residual chirp in the IF signal prior to digitization. After digitization, the residual IF chirp is removed with digital signal processing.

20 Claims, 2 Drawing Sheets

RADAR ECHO PROCESSING WITH PARTITIONED DE-RAMP

This application claims the priority under 35 U.S.C. §119 (e)(1) of co-pending provisional application Ser. No. 61/352,853 filed Jun. 9, 2010 and incorporated herein by reference.

This invention was developed under Contract DE-AC04-94AL85000 between Sandia Corporation and the U.S. Department of Energy. The U.S. Government has certain rights in this invention.

FIELD OF THE INVENTION

The present work relates generally to radar signal processing and, more particularly, to de-ramp processing of radar echo signals.

BACKGROUND OF THE INVENTION

De-ramp or "stretch" processing is commonly used in high-performance, wide-bandwidth radar systems to obtain fine range resolution without requiring unreasonably high or unobtainable Analog to Digital Converter (ADC) sampling frequencies and the resulting data processing burden. Systems that employ linear-FM "chirp" waveforms typically employ pulse compression by de-ramping, which mixes (convolves) the received signal (radar echo) with a reference chirp waveform. The linear-FM chirp is completely removed by the de-ramp mixer because the reference chirp rate is matched to the chirp rate of the received radar echo signal. A conventional example of this is shown graphically in the frequency-vs.-time plot of FIG. 1. The resulting Intermediate Frequency (IF) bandwidth at the de-ramp output is usually a fraction of the input bandwidth. This bandwidth compression permits an ADC to meet the needs of a radar system having an RF bandwidth that is considerably larger than the Nyquist (half sample rate) bandwidth of the ADC.

In wide bandwidth, high dynamic range radar modes such as Synthetic Aperture Radar (SAR) and Moving Target Indication (MTI), point-targets (those returns that occupy a single range "bin") are often prevalent. With conventional de-ramp processing, the point targets result in corresponding single-frequency tones (sinusoids) at the ADC input. It is well known that pure sinusoids combined with ADC nonlinearities (e.g., Integral Non-Linearity or INL) result in undesired spurious signals with maximum peak spectral amplitude. In SAR systems, the result is false targets in the range/Doppler imagery. In MTI systems, the result is false detections. Other noise sources (described hereinbelow) are also known to generate unwanted spurious signals and corresponding false results.

FIGS. 2 and 3 graphically illustrate an example of the result of conventional de-ramp processing using the reference chirp of FIG. 1. FIGS. 2 and 3 show the desired output signal together with the aforementioned undesired spurs. FIG. 2 is a frequency-vs.-time plot, and FIG. 3 is an amplitude-vs.-time plot. As shown, spurs due to ADC nonlinearities and other noise sources manifest as harmonically related sine wave tones in addition to the sine wave tone of the desired output signal. The result is a minimization of spurious-free dynamic range (i.e., the spurs extend above the noise floor in FIG. 3) and correspondingly reduced system performance.

It is desirable in view of the foregoing to provide for processing techniques that reduce the aforementioned incidences of false results in radar systems.

DETAILED DESCRIPTION

Exemplary embodiments of the present work modify the nature of the signal produced by a point-target, such that the signal deviates from a single-frequency tone, which in turn reduces the peak spurious amplitude in the data product. This is accomplished in some embodiments by apportioning the de-ramp operation across analog and digital processing domains. The reference chirp is selected to exhibit a slightly different frequency-vs.-time slope than that of the radar echo signal returned from the target. This results in a "partial" de-ramping operation in the analog processing domain, which produces a residual chirp at the ADC input. The residual chirp prevents point target signals from compressing to single-tone sinusoids at the ADC input. The residual chirp is ultimately removed by a de-ramp process in the digital processing domain, which recovers the single-tone representation of the point target signal. Although the desired output signal does "compress" to a sinusoid after the digital domain de-ramp, the undesired spurious products generated by the ADC do not. Instead, the spurs retain a linear-FM chirp characteristic that results in a frequency spreading in the output spectrum, and hence a corresponding reduction in peak amplitude. The reduction in peak amplitude results in increased dynamic range.

Figure 4:
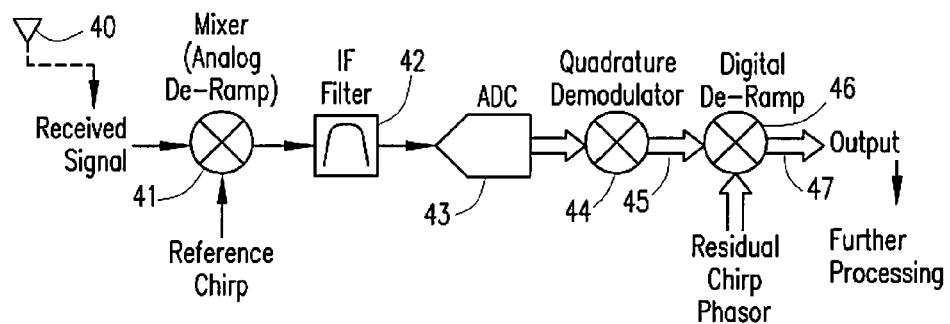
FIG. 4 diagrammatically illustrates a radar receiver apparatus according to exemplary embodiments of the present work.

FIG. 4 diagrammatically illustrates a radar receiver apparatus that implements a partitioned de-ramp process according to exemplary embodiments of the present work.

In various embodiments, the apparatus is capable of operating in SAR and MTI modes. The apparatus includes an analog signal processing portion (or path) shown generally at 40-42, a digital signal processing portion (or path) shown generally at 44-47, and an ADC portion at 43 interfacing between the analog and digital portions. As described below, de-ramp processing is partitioned between the analog and digital portions, thereby to improve upon conventional de-ramp processing.

The radar echo signal, received via a conventional antenna arrangement 40 and conventional front-end components (which are well known in the art and thus not explicitly shown, but represented by broken line in FIG. 4), is input to an analog mixer 41 for frequency downconversion to an IF frequency bandwidth. The mixer 41 removes a majority of the linear FM frequency-vs.-time (F-T) slope, also referred to as chirp, prior to conventional IF filtering at 42 and sampling by the ADC at 43. The remainder of the echo signal chirp (the residual chirp) is removed after the ADC 43 by a digital de-ramp processor shown at 46. In some embodiments, the digital de-ramp processor 46 is implemented as a conventional digital mixer as shown in FIG. 4. The output of the digital de-ramp processor 46 is available for further radar (e.g., SAR, MTI, etc.) processing as shown. Such further processing is conventionally known in the art.

The partitioned de-ramp processing shown in FIG. 4 differs from conventional de-ramp processing in that the de-ramp operation is partitioned between the analog and digital processing domains. The reference chirp is selected to have an F-T characteristic that differs from the F-T characteristic of the radar echo signal (see also FIG. 5 as discussed in more detail below). In contrast, the reference chirp in conventional de-ramp processing has the same F-T characteristic as the radar echo signal (see also FIG. 1). As a result, conventional de-ramp processing completely removes the chirp from the received echo signal by operation of the mixer 41 in the analog processing domain, whereas partitioned de-ramp processing removes only a part of the echo signal chirp with the mixer 41 in the analog domain, and removes the remainder of the echo signal chirp in the digital domain.

Partitioned de-ramp processing also differs from conventional de-ramp processing in that the digital de-ramp processor 46 in FIG. 4 provides the end result for further processing. In contrast, in the case of conventional de-ramp processing, the end result for further processing is provided at the output 45 of a conventional quadrature demodulator 44. Accordingly, if the radar echo signal and the reference chirp are as shown in FIG. 1, which represents conventional de-ramp processing, then the conventional output illustrated in FIGS. 2 and 3 would be present at the quadrature demodulator output 45 of FIG. 4.

Figure 1:
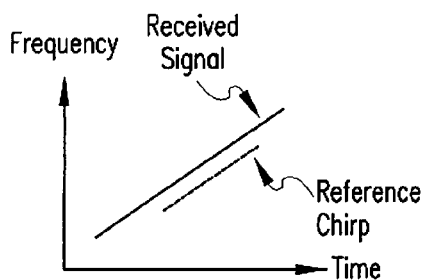
FIG. 1 graphically illustrates a radar echo signal and reference chirp waveform for de-ramping according to the prior art.
Figure 2:
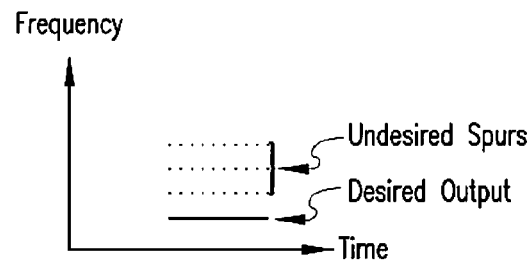
FIGS. 2 and 3 are plots of the result of de-ramping with the reference chirp waveform of FIG. 1.
Figure 3:
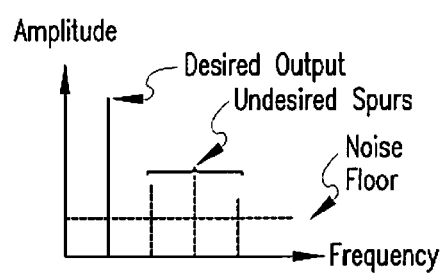
Figure 5:
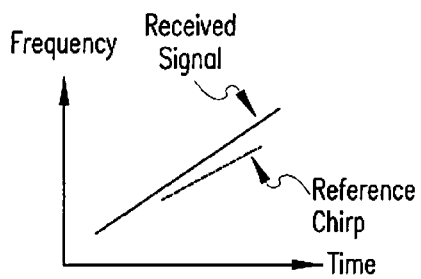
FIG. 5 graphically illustrates a radar echo signal and reference chirp waveform for de-ramping according to exemplary embodiments of the present work.
Figure 6:
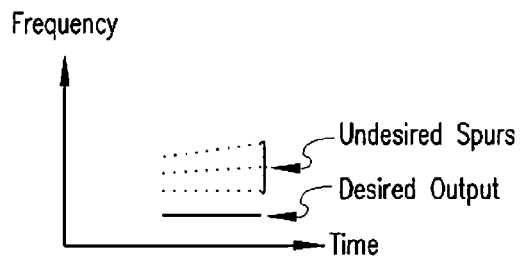
FIGS. 6 and 7 are plots of the result of partitioned de-ramping with the analog reference chirp waveform of FIG. 5 with a subsequent digital de-ramp.
Figure 7:
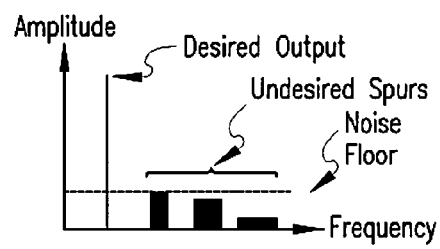

FIGS. 5-7 are similar to FIGS. 1-3, respectively, and graphically illustrate the effect of partitioned de-ramp processing according to exemplary embodiments of the present work. FIG. 5 shows a reference chirp having a different F-T characteristic than the radar echo signal. In some embodiments, the reference chirp has an F-T slope that is less than the F-T slope of the echo signal as shown. For example, in various embodiments, the F-T slope of the reference chirp is 95 to 99% of the F-T slope of the echo signal. FIGS. 6 and 7 illustrate characteristics of the output of the digital de-ramp processor 46. As shown in FIG. 6, spurious artifacts retain a linear-FM chirp after the digital de-ramp processing, resulting in a spectral spreading of the undesired spurious energy. FIG. 7 shows that the spectral spreading of FIG. 6 provides a corresponding improvement in spurious-free dynamic range (compare FIG. 7 to FIG. 3).

Referring again to FIG. 4, and as explained in more detail hereinbelow, the appropriate residual chirp phasor to be applied to the digital mixer 46 to remove the residual chirp may be readily determined based on the difference between the F-T slopes in FIG. 5. The residual chirp phasor is easily implemented as a complex (real and imaginary) direct digital synthesizer (DDS). The DDS as well as digital processing elements 44, 45, and 46 can be readily implemented in suitable digital signal processing (DSP) hardware such as a field programmable gate array (FPGA).

By selecting the chirp waveform parameters of the radar, the bandwidth of the residual chirp at the ADC input can be adjusted. Tradeoffs between residual chirp bandwidth, available IF bandwidth and the desired "spreading loss" of the spurious artifacts can be made to optimize the performance of the system for various operational modes.

Partitioned de-ramp processing is also capable of mitigating additional unwanted IF signal artifacts such as waveform generator spurious signals, analog exciter harmonics and spurs, and additive artifacts like processor clock noise, power supply noise, etc. These "internal interference" signals are often difficult to differentiate from desired radar echoes due to their single-frequency-plus-harmonic content. As such, they can reduce the effective dynamic range in conventional high performance, wideband radar systems.

Referring again to FIG. 4, at the input of analog mixer 41, the received signal from a point target at a fixed range from the radar has the complex form $$x_{RX} = e^{j[\omega_T(t-t_s)+\frac{\gamma_T}{2}(t-t_s)^2]}. \tag{1}$$

Where:

$\omega_\omega$ is the starting frequency of the transmit waveform in radians/second, $\gamma_T$ is the chirp rate of the transmit waveform in radians/second$^2$, t is time in seconds, and $t_s$ is the delay time from transmit to receive for the point target in seconds.

For simplification, Equation (1) assumes unit amplitude of the received signal and ignores any arbitrary fixed phase offset.

The reference chirp of FIGS. 4 and 5 has a form similar to received signal $X_{RX}$:

$$x_{REF} = e^{j[\omega_R t+\frac{\gamma_R}{2}t^2]}, \tag{2}$$

where $\omega_R$ and $\gamma_R$ are, respectively, the starting frequency and the chirp rate of the reference chirp waveform. Assuming that the mixer 41 is converting directly to baseband ($\omega_R=\omega_T$), then the output of the mixer has the form $$x_{IF} = e^{j[-\omega_T t_s+\frac{\gamma_T}{2}t_s^2-\gamma_T t_s t+(\frac{\gamma_T-\gamma_R}{2})t^2]}. \tag{3}$$

In reality, conversion to baseband is conventionally performed in multiple steps using one or more intermediate band-pass frequencies. Either way, the final representation of the baseband signal is that of Equation (3).

The first two terms of the phase in Equation (3) are constant for a target at fixed to delay $t_s$ and can be ignored. The third term is recognized as a sinusoid of frequency $\gamma_T t_s$. This is the primary point target signal that manifests as a sinusoid with frequency equal to the product of the transmit chirp rate and the target's relative delay time. The fourth term is a quadratic phase term representing the residual chirp.

In the prior art, the transmit chirp rate and the reference chirp rate are the same. Ignoring the constant phase terms of Equation (3), the baseband signal is simply:

$$X_{IF}=e^{-j\gamma_T t_s t} \tag{4}$$

So a point target at fixed delay $t_s$ manifests as a sine wave of frequency $\gamma_T t_s$ at baseband, as has been previously stated.

Exemplary embodiments of the present work introduce an offset between the transmit chirp rate and the reference chirp rate ($\gamma_T \neq \gamma_R$), thus introducing the fourth phase term in Equation (3), corresponding to the residual chirp. The effect of this term can be illustrated in the case of unwanted ADC nonlinearities. The effect of ADC nonlinearities (INL) on the sampled baseband signal is to introduce harmonic multiples of the phase term of Equation (3). Ignoring the constant phase terms of Equation (3), and assuming $\gamma_T \neq \gamma_R$, the baseband signal with harmonics may be represented as $$x_{IF} = \sum_{h=1}^{N} \alpha_h e^{j[h(-\gamma_r t_s t + (\frac{\gamma_T - \gamma_R}{2})t^2) + \phi_h]}. \quad (5)$$

Where:

h is the harmonic number,

N is the maximum harmonic number to consider, $\alpha_h$ is the harmonic amplitude which is arbitrary except for $\alpha_1 = 1$, and $\Phi_h$ is the harmonic phase, which is arbitrary except for $\Phi_1 = 0$, The actual quantities $\alpha_h$, $\Phi_h$, and N are a complex function of the ADC conversion characteristics and the amplitude of the baseband signal relative to the ADC full-scale voltage. For the purpose of describing partitioned de-ramp processing, quantifying these terms is not necessary.

The residual chirp should be removed from the digitized signal. With the signal represented digitally as an in-phase and quadrature-phase pair of real signals, a complex analytical representation of the signal is retained, as represented in Equation (5). The digital de-ramp function simply multiples $X_{IF}$ of Equation (5) by a digital chirp $X_{DD}$ (phase quadratic) of the form:

$$x_{DD} = e^{-j(\frac{\gamma_T - \gamma_R}{2})t^2}. \quad (6)$$

This corresponds to the residual chirp phasor of FIG. 4. Multiplying $X_{IF}$ of Equation (5) by $X_{DD}$ of Equation (6) yields $$\hat{x}_{IF} = \sum_{h=1}^{N} \alpha_h e^{j[-h\gamma_T t_s t + (h-1)(\frac{\gamma_T - \gamma_R}{2})t^2) + \phi_h]}. \quad (7)$$

Examination of Equation (7) Reveals:

1. The fundamental signal (h=1) takes the form of the complex single-frequency sine wave of Equation (4). This is the desired signal.

2. If no chirp offset is introduced ($\gamma_T = \gamma_R$, i.e., no residual chirp), then the harmonics manifest as single frequency tones of frequency $h\gamma_T t_s$ which undesirably maximizes their peak spectral amplitude. This is the situation shown in the example of FIGS. 2 and 3.

3. With a residual chirp ($\gamma_T \neq \beta_R$), harmonics at the ADC output (h>1) are now chirps with a chirp rate of $(h-1)(\gamma_T - \gamma_R)$. This spectrally spreads the energy of the unwanted harmonics in the range-domain of the radar, thus beneficially reducing their peak amplitude. The frequency-vs.-time plot of FIG. 6 illustrates the spectral spreading of the harmonics (undesired spurs) introduced by the residual chirp, which correspondingly improves the spurious-free dynamic range as shown in FIG. 7.

Determining just how much residual chirp ($\gamma_T - \gamma_R$) to introduce is a tradeoff between the amount of suppression required for the peak spurs at the ADC output and the amount of IF bandwidth that can be utilized for the residual chirp. Additional reduction in peak spurious levels can be afforded by increasing the residual chirp rate, but at a cost of additional IF bandwidth.

Similar results are obtained for the aforementioned "internal interference" signals. The digital de-ramp process serves, as with the ADC harmonics, to bandwidth compress the desired signal into a single-frequency sine wave while introducing a chirp to the undesired signals, thus reducing their peak spectral amplitude.

Although exemplary embodiments are described above in detail, this does not limit the scope of the invention, which can be practiced in a variety of embodiments.

What is claimed is:

1. A method of processing a radar echo signal, comprising:
   receiving a radar echo signal having a first predetermined rate of frequency variation over time;
   mixing the radar echo signal with an analog reference signal to produce a frequency-downconverted signal, wherein the analog reference signal has a second predetermined rate of frequency variation over time, and wherein said second rate is selected to differ from said first rate by a predetermined amount;
   processing the frequency-downconverted signal to produce a first digital signal; and
   mixing said first digital signal with a digital reference signal to produce an output digital signal.

2. The method of claim 1, wherein said digital reference signal is indicative of said difference between said second rate and said first rate.

3. The method of claim 2, wherein said processing includes filtering the frequency-downconverted signal to produce a filtered signal, performing an analog-to-digital conversion operation on said filtered signal to produce a second digital signal, and performing a digital demodulation operation on said second digital signal to produce said first digital signal.

4. The method of claim 1, wherein said processing includes filtering the frequency-downconverted signal to produce a filtered signal.

5. The method of claim 4, wherein said processing includes performing an analog-to-digital conversion operation on said filtered signal to produce a second digital signal.

6. The method of claim 5, wherein said processing includes performing a digital demodulation operation on said second digital signal to produce said first digital signal.

7. The method of claim 1, wherein said radar echo signal is associated with one of a Synthetic Aperture Radar (SAR) mode of radar operation and a Moving Target Indication (MTI) mode of radar operation.

8. A method of processing a radar echo signal, comprising:
   receiving a radar echo signal that includes a point target component produced by radar signal reflection from a point target; and
   mixing the radar echo signal with an analog reference signal to produce a frequency-downconverted signal, wherein the analog reference signal is selected to ensure that said point target component is prevented from downconverting into a single frequency tone in said frequency-downconverted signal.

9. The method of claim 8, including processing the frequency-downconverted signal to produce a first digital signal, and mixing said first digital signal with a digital reference signal to produce a second digital signal.

10. The method of claim 9, wherein said processing includes filtering the frequency-downconverted signal to produce a filtered signal, performing an analog-to-digital conversion operation on said filtered signal to produce a third digital signal, and performing a digital demodulation operation on said third digital signal to produce said first digital signal.

11. The method of claim 8, wherein said radar echo signal is associated with one of a SAR mode of radar operation and an MTI mode of radar operation.

12. A method of processing a radar echo signal, comprising:

receiving a radar echo signal having an associated chirp;

removing the chirp from the radar echo signal, including implementing a predetermined partitioning of chirp removal between analog signal processing and digital signal processing, wherein said predetermined partitioning allocates removal of a predetermined part of the chirp to analog signal processing and allocates removal of a remainder of said chirp to digital signal processing.

13. The method of claim 12, wherein said radar echo signal includes a point target component produced by radar signal reflection from a point target, and wherein said analog signal processing includes mixing the radar echo signal with an analog reference signal to produce a frequency-downconverted signal such that said point target component is prevented from downconverting into a single frequency tone in said frequency-downconverted signal.

14. An apparatus for processing a radar echo signal, comprising:

an input for receiving a radar echo signal having a first predetermined rate of frequency variation over time;

an analog mixer coupled to said input for mixing the radar echo signal with an analog reference signal to produce a frequency-downconverted signal, wherein the analog reference signal has a second predetermined rate of frequency variation over time, and wherein said second rate is selected to differ from said first rate by a predetermined amount;

a signal processing path coupled to said analog mixer and configured to process the frequency-downconverted signal to produce a first digital signal; and a digital processor coupled to said signal processing path for mixing said first digital signal with a digital reference signal to produce an output digital signal.

15. The apparatus of claim 14, wherein said digital reference signal is indicative of said difference between said second rate and said first rate.

16. The apparatus of claim 15, including a signal processing path coupled to said analog mixer and configured to process the frequency-downconverted signal to produce a first digital signal, and a digital processor coupled to said signal processing path for mixing said first digital signal with a digital reference signal to produce a second digital signal.

17. The apparatus of claim 16, wherein said signal processing path includes a filter for filtering the frequency-downconverted signal to produce a filtered signal, an analog-to-digital converter coupled to said filter for converting said filtered signal into a third digital signal, and a digital demodulator coupled to said analog-to-digital converter for demodulating said third digital signal to produce said first digital signal.

18. An apparatus for processing a radar echo signal, comprising:

an in input for receiving a radar echo signal that includes a point target component produced by radar signal reflection from a point target; and an analog mixer coupled to said input for mixing the radar echo signal with an analog reference signal to produce a frequency-downconverted signal, wherein the analog reference signal is selected to ensure that said point target component is prevented from downconverting into a single frequency tone in said frequency-downconverted signal.

19. An apparatus for processing a radar echo signal, comprising:

an input for receiving a radar echo signal having an associated chirp;

an analog signal processing portion coupled to said input; and a digital signal processing portion coupled to said analog signal processing portion;

wherein said analog signal processing portion and said digital signal processing portion are cooperable to remove the chirp from the radar echo signal by implementing a predetermined partitioning of chirp removal between analog signal processing and digital signal processing, and wherein said predetermined partitioning allocates removal of a predetermined part of the chirp to analog signal processing and allocates removal of a remainder of the chirp to digital signal processing.

20. The apparatus of claim 19, wherein said radar echo signal includes a point target component produced by radar signal reflection from a point target, and wherein said analog signal processing portion includes an analog mixer for mixing the radar echo signal with an analog reference signal to produce a frequency-downconverted signal such that said point target component is prevented from downconverting into a single frequency tone in said frequency-downconverted signal.

\* \* \* \* \*